United States Patent [19]

Faria et al.

[11] Patent Number: 4,616,860
[45] Date of Patent: Oct. 14, 1986

[54] SEAL STRUCTURE FOR METAL VACUUM JOINT

[75] Inventors: Carl R. Faria, San Leandro; Thomas W. Snouse, Fremont, both of Calif.

[73] Assignee: Thermionics Laboratory, Inc., Hayward, Calif.

[21] Appl. No.: 588,452

[22] Filed: Mar. 12, 1984

[51] Int. Cl.⁴ .............................................. F16L 19/00
[52] U.S. Cl. .................................... 285/336; 285/328; 285/917; 285/368; 285/405; 277/167.5; 277/171
[58] Field of Search ............... 285/336, 328, DIG. 18, 285/363, 368, 405, 412; 277/167.5, 171

[56] References Cited

U.S. PATENT DOCUMENTS

| | | | |
|---|---|---|---|
| 3,201,725 | 8/1965 | Johnson | 285/336 |
| 3,208,758 | 9/1965 | Carlson et al. | 285/336 X |
| 3,521,892 | 7/1970 | Sheesley et al. | 285/336 X |

Primary Examiner—Richard J. Scanlan, Jr.
Attorney, Agent, or Firm—Julian Caplan

[57] ABSTRACT

Each of a pair of annular, especially non-circular, apertured flanges for vacuum joints are formed by machining an outer groove spaced in from the outer edge, an inner groove extending inward from the inner margin of the joint and an outward slanted side interconnecting the two grooves resulting in a sharp corner on the inner edge of the inner groove. A flange spacer, apertured to receive the bolts which draw the flanges together is positioned in the outer groove of both flanges. A soft metal (e.g., copper) gasket overlies the inner grooves. When the bolts are tightened, the gasket deforms outwardly under the pressure of the sharp corners to seal against both slanted surfaces to form an ultra-high vacuum joint which is "bakeable." For temporary testing of joints a portion of the gasket immediately overlying the corners may be replaced with an elastomeric ring.

3 Claims, 7 Drawing Figures

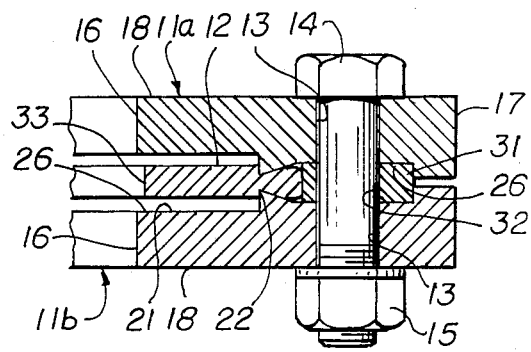
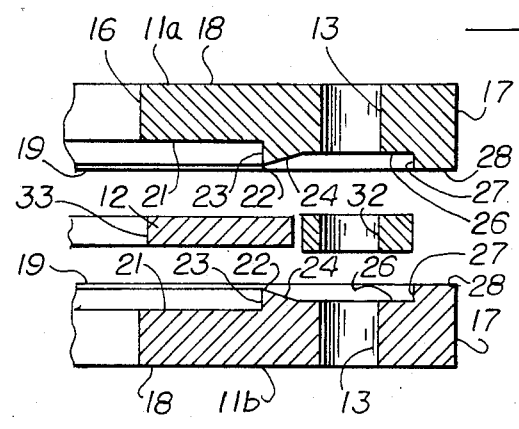
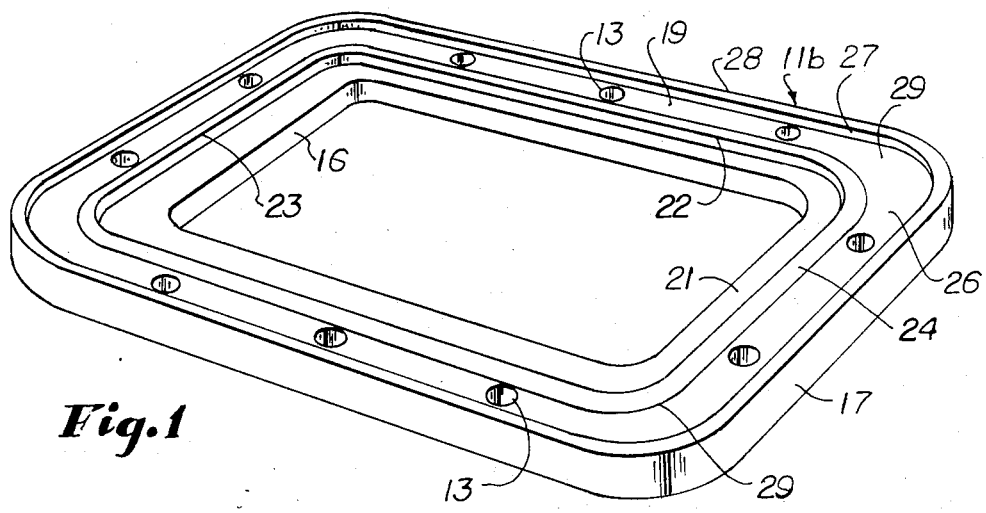
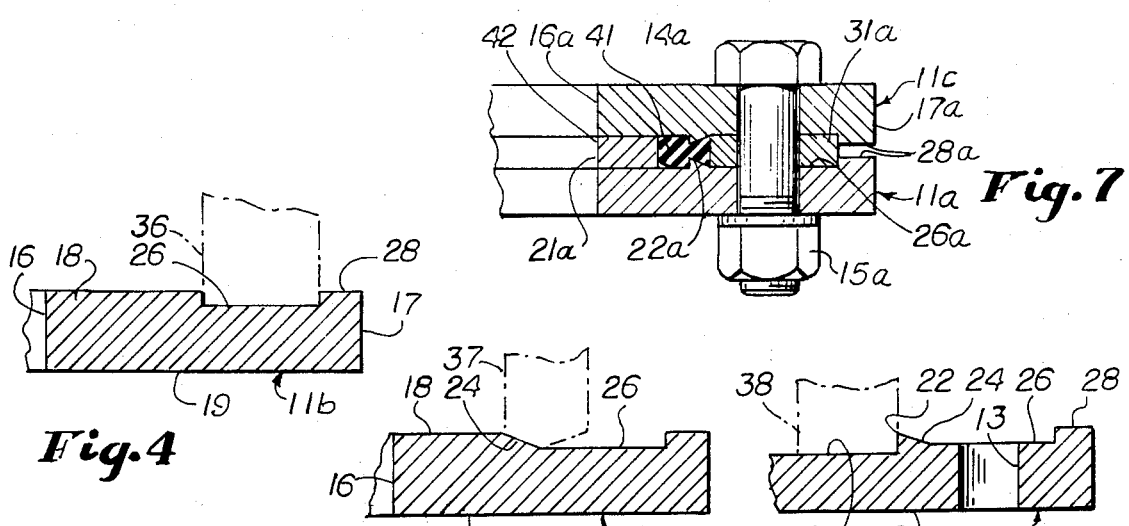

SEAL STRUCTURE FOR METAL VACUUM JOINT

This invention relates to a new and improved seal structure for metal vacuum joint and method of fabricating same. More particularly, this invention relates to an improvement upon U.S. Pat. No. 3,208,758. Machining the structure disclosed in said U.S. Pat. No. 3,208,758 for round flanges is relatively easy; however, it has heretofore not been economically feasible to machine such structure for noncircular flanges. The present invention relates to a structure and a method of machining the same which incorporates all of the advantages of the aforementioned patent (to which reference is made for a more complete enumeration thereof) and yet enables the joint to be made in noncircular shape, if desired.

A further feature of the invention is the fact that a noncircular structure may be fabricated using ordinary machine tools (e.g., milling machine) and ordinary tooling therefor (e.g., end mills).

A further feature of the invention is the use of a flange spacer which confines the soft metal gasket in its deformation so that the flow of metal is directed to form a very tight seal so that the unit in which the joint is incorporated may be subjected to ultra-high vacuum.

A further feature of the invention is the fact that the spacer is removable from the combination. Ordinarily when the spacer is removed the soft metal gasket remains with the spacer. Alternatively, the spacer may be permanently secured to one or the other of the flanges which make up the joint, as by tack welding.

A further advantage of the invention is that the shape of the parts is such that when the equipment is subjected to vacuum, no pockets of air exist. Hence there is no extraordinary difficulty in evaouating the device in which the invention is incorporated.

A further important feature of the invention is the fact that although the parts may be of different materials and hence expand and contract at different rates during the "baking" which conventionally is used in the evacuation of devices in which the invention is installed, such differential of expansion of the parts is readily accommodated.

In some instances it is desirable to temporarily seal two flanges together. The use of an expensive soft metal flange for such purpose is unnecessarily expensive. Hence, in the modification of the present invention, the soft metal gasket is replaced by an elastomeric gasket and such gasket is confined on its inner edge by a seal support ring which limits inward deformation of the elastomeric seal ring.

Other objects of the present invention will become apparent upon reading the following specification and referring to the accompanying drawings in which similar characters of reference represent corresponding parts in each of the several views:

In the drawings:

FIG. 1 is a perspective view of one of the flange members used in the joint of the present invention, said flange member being rectangular in general shape.

FIG. 2 is an enlarged fragmentary exploded sectional view of the members forming the joint of the present invention prior to assembly.

FIG. 3 is a view similar to FIG. 2 showing the joint completed.

FIGS. 4, 5 and 6 are schematic fragmentary sectional views illustrating steps in the method of fabrication of the flange of FIG. 1.

FIG. 7 is a view similar to FIG. 3 of a modification using an elastomeric (temporary) seal.

The structure of the present invention, prior to assembly, consists of several parts including a top flange member 11a and a bottom flange member 11b which is substantially a duplicate of member 11a. The members 11a and 11b are preferably of a hard metal such as stainless steel. Partially interposed between the members 11a and 11b is a sealing gasket 12 of a soft metal such as copper which is deformable under compression to effect the ultra high vacuum seal required in certain installations.

The flange members 11a and 11b are formed with bolt holes 13 adjacent their outer edges 17 to receive bolts 14 and the flanges are drawn together by tightening nuts 15 on the bolts 14.

Each flange member has an inner edge 16 and an outer edge 17, which edges are usually smooth. The outer sides of the members are flat sides 18 and the inner sides 17 have machined second sides 19. An inner groove 21 is formed in face 19 extending outward from inner edge 16. Outward of groove 21 is a sharp corner 22 formed at the intersection of side 23 (which is preferably perpendicular to the bottom of groove 21) and slanted outer side 24. Outward of slanted side 24 is outer groove 26. The angle between the plane of the groove 26 and the side 24 is variable but is preferably about 20 degrees. Groove 26 terminates in an outer vertical shoulder 27. The edge 28 of the flange member is parallel to the plane of groove 26 and is elevated slightly above the elevation of corner 22.

As best shown in FIG. 1, the corners 29 of the rectangular flange members are rounded, which means that grooves 21 and 26 as well as the sloping side 24 are curved at the corners 29.

In accordance with the present invention a flange spacer 31 is employed which substantially fills the bottom of groove 26 and extends above the level of raised edge 28. Spacer 31 is also thicker than the sealing gasket 12. The inside dimension of spacer 31 is preferably larger than the outside dimension of gasket 12 by a small fraction, such as approximately 0.02 inches, in the initial, unstressed, condition of the joint shown in FIG. 2. Spacer 31 is formed with holes 32 aligned with the holes 13.

The parts shown in initial condition in FIG. 2 are assembled by first installing the spacer 31 in groove 26 of lower flange 11b and then installing the sealing gasket 12 inside the spacer 31. Thereupon the upper flange member 11a is positioned above the ring 31 and gasket 12. Bolts 14 are inserted through the holes 13 and 32. To form the seal, nuts 15 on bolts 14 are tightened causing the sharp corners to dig into the soft metal of the sealing gasket. The metal of the gasket 12 deforms outwardly under compression. The inner edge of the spacer 31 confines outward deformation of the gasket 12 causing it to tightly seal against the surfaces 24. It will further be seen from FIG. 3 that the spacer 31 limits how far the members 11a and 11b can be drawn together and hence prevents overstressing of the gasket 12.

As has previously been stated, there is no known economical way in which the cross-sectional shape of the flange shown in FIGS. 1 and 2 of U.S. Pat. No. 3,208,758 can be fabricated except where the flanges are circular amd are made on a lathe or the like. The present invention enables a structure to be made with conventional machine tools and tooling, as is illustrated schematically in FIG. 4. Thus a rectangular cross-section blank for flange member 11b initially has smooth sides 18 and 19 and smooth inner and outer edges 16 and 17. The first fabrication step is illustrated in FIG. 4. A milling cutter 36 having a squared-off bottom end in the mill edge is used to cut the groove 26 spaced an appropriate distance inward from edge 17. If the width of groove 26 is greater than the diameter of mill 36, several passes of the mill may be performed. The next step in the fabrication is shown in FIG. 5. A milling tool 37 which has a bottom edge complementary to the slanted surface 24 (e.g., at an angle of, say, 20 degrees) is used immediately inside the inner edge of groove 26, thus forming the slanted surface 24. The third step in the fabrication is shown in FIG. 6. A milling cutter 38 similar to the cutter 36 is used to form the groove 21 and the inner side 23. Several passes of the cutter 38 may be used if the groove 21 is wider than the diameter of the cutter 38. Thereupon the holes 13 are bored.

FIG. 7 illustrates a modification which is particularly useful where one or more tests of the tightness of the device when subjected to vacuum is required and it is undesirable to spoil the relatively expensive gaskets 12. For such purposes an elastomeric seal ring 41 is used fitting inside a rectangular cross-section seal support ring 42 which is of a thickness equal to the thickness of flange spacer 31a. Flange members 11c and 11d resemble flange members 11a and 11b in the preceding modifications. The same reference numerals as used in FIGS. 1-6 are used in FIG. 7 to designate corresponding elements, all followed by the subscript a. After the parts have been assembled, the nuts 15a are drawn tight causing the sharp corners 22a to dig into the ring 41 and deform the same. The inner edge of the spacer ring 31a and the outer edge of the seal support ring 42 confine the radial deformation of the ring 41 so that a tight seal is effected in the same manner as the preceding modification. Since the rings 41 are relatively inexpensive, they may be used one or several times and then discarded. However, for permanent installation it is desirable to use a soft metal gasket such as the gasket 12 of FIGS. 2 and 3.

What is claimed is:

1. A vacuum joint comprising a pair of spaced flange members adapted for relative movement along a longitudinal axis, each said member having facing surfaces normal to said axis, each said facing surface having an inner edge and outer edge, each said facing surface being formed with a milled annular inner groove having an outer edge parallel to said axis, a milled annular outer groove having an outer shoulder, a milled annular slanted surface extending radially inwardly and axially toward the opposite member from the outer edge of said inner groove in a sharp corner spaced inward from said inner edge, an annular soft metal gasket of substantially rectangular cross-section between said flange members extending outward of said sharp corners and inward of said sharp corners, a spacer ring discrete from said members and from said gasket filling said outer groove and abutting said outer shoulder and having a thickness to hold said facing surface spaced apart, said deformable member being initially of slightly smaller outside dimension than the inside dimension of said spacer ring, said spacer ring confining deformation of said deformable member when said flange members are drawn together to cause said deformable member to seal against said sharp corners and said slanted surfaces, said sharp corners being closer together than said portions of said facing surfaces outside said outer grooves, said inner and outer grooves, said slanted surface, said deformable member and said spacer ring being non circular.

2. A joint according to claim 1 in which said spacer ring and both said flange members are formed with aligned holes parallel to said longitudinal axis and which further comprises fastening means through said holes to draw said flange members toward each other along said longitudinal axis.

3. A joint according to claim 1 in which said spacer ring is removable from said outer grooves.

* * * * *